United States Patent [19]

Joshi

[11] Patent Number: 4,674,321
[45] Date of Patent: Jun. 23, 1987

[54] LEAK DETECTOR
[75] Inventor: Ashok V. Joshi, Salt Lake City, Utah
[73] Assignee: Ceramatec, Inc., Salt Lake City, Utah
[21] Appl. No.: 805,776
[22] Filed: Dec. 6, 1985
[51] Int. Cl.⁴ .............................................. G01M 3/16
[52] U.S. Cl. .................................. 73/40.7; 204/412; 429/152
[58] Field of Search ................. 73/40.7; 204/412, 415, 204/416, 419, 420; 429/152

[56]  References Cited
U.S. PATENT DOCUMENTS 3,514,377  5/1970  Spacil et al. ..................... 204/412 X
3,650,934  3/1972  Hickam et al. .................... 204/412
3,843,400  10/1974  Radford et al. ................... 429/152

Primary Examiner—Jerry W. Myracle
Assistant Examiner—Joseph W. Roskos
Attorney, Agent, or Firm—Trask, Britt & Rossa

[57]  ABSTRACT

A leak detector employing an ion-conducting membrane is disclosed. An oxygen-ion conducting membrane which employs a high vacuum on one side is used to detect very small quantities of oxygen flowing through a minute fissure in a part to be tested for leaks. The oxygen-ion conducting membrane is biased with direct current voltage to drive oxygen-ions through the membrane away from the high vacuum side.

19 Claims, 2 Drawing Figures

LEAK DETECTOR

BACKGROUND OF THE INVENTION

1. Field

The instant invention relates to leak detectors for detecting very small leaks in small volume enclosures.

2. State of the Art

Existing leak detectors for detecting very small leaks existing in small volume enclosures generally involve a mass spectrometer. An enclosure to be tested, for example, a tube with one closed end and one open end, is sealed to an open-ended conduit of the leak detector. A vacuum is applied through the conduit to the tube to evacuate the system. The exterior of the tube is then sprayed with helium gas so that any fissures in the tube will permit helium to pass from the outside of the tube at a pressure close to one atmosphere into the vacuum very low pressure environment inside the tube. The helium is then transported through the leak detector device to a mass spectrometer which measures the amount of helium present.

The mass spectrometer leak detectors are accurate when used carefully. However, a mass spectrometer is a relatively complicated device and it is necessary to have a rare gas such as helium present to eliminate artifacts.

A typical mass spectrometer device is illustrated in FIG. 1. This device employs a tungsten element which frequently burns out if the device is operated without a device to be tested in place. Any significant quantity of oxygen reaching the hot tungsten filament causes it to oxidize rapidly.

Also, the sample to be tested is utilized by "spraying" helium on the part to be tested. Since only helium ions are detected within the mass spectrometer, unless the sample is completely bathed in helium to the exclusion of all air, an extremely accurate quantitative determination of a leak will not be possible.

Sensors of various types utilized ion-conducting membranes. Exemplary of sensor devices employing zirconia membranes are those disclosed in U.S. Pat. Nos. 3,843,400 of Radford, et al., and 3,650,934 of Hickam, et al. Most sensors of this type operate at ambient pressures and measure electromotive force generated by oxygen partial pressure differentials as being indicative of oxygen concentration on one side of the membrane when a reference gas of known oxygen concentration is present on the other side of the membrane.

SUMMARY OF THE INVENTION

An electrochemical leak detector for detecting minute leaks in very small volume enclosures is disclosed. The leak detector comprises a gas-tight chamber having inlet and outlet openings with at least a part of the wall of said chamber being constructed of an oxygen-ion conducting membrane. The complete walls of the chamber may be constructed of the oxygen-ion conducting membrane. On each surface of the oxygen-ion conducting membrane is an oxygen-permeable electrode. Generally, such electrodes comprise a noble metal or a semi-conducting oxide material. These materials are oxidation resistant and do not absorb or otherwise react or capture available oxygen molecules or ions. Also, these materials exhibit sufficient catalytic activity to dissociate oxygen molecules into ions.

The device further has valve means for opening and closing inlet and outlet means to the gas-tight chamber. The inlet means is connected through a conduit to sealing connection means to accommodate connection to the leak detector in a leak-proof manner, of a sample article to be leak tested. The outlet means of the chamber is connected via a conduit to a high vacuum source. A voltage in the range of about 0.5 to about 2.0 volts is impressed across the two electrodes with the polarity on vacuum side. The impressed voltage is adjusted to null the current caused by Nerst voltage created due to vacuum which creates an oxygen partial pressure differential.

The voltage source is a direct current power source with leads being connected so that the inner electrode is a cathode and the outer electrode is an anode. Oxygen ions are caused to migrate from the cathode to the anode with the voltage being impressed for a sufficient period of time to deplete the existing oxygen present originally in the chamber so that the cathode is starved of oxygen ions. If a sample article connected to the leak detector has an open fissure, even a very minute one (e.g., $10^{-8}$ to $10^{-10}$ cubic centimeters per second), air will vent through the fissure thereby introducing oxygen into the chamber. The starved cathode will immediately react, a current will be registered and a quantitative determination of the size of the leak may be made from a microamp meter.

DESCRIPTION OF THE ILLUSTRATED EMBODIMENTS

An electrochemical leak detector employing an oxygen-ion conducting membrane is disclosed. The oxygen-ion membrane may typically be stablized zirconia although other oxygen-ion conducting membranes such as hafnia, ceria, thoria, bismuthoxide, and mullite may be utilized.

An effective oxygen-ion conductor for the purposes of this invention preferably has an ionic conductivity in the range of about $1 \times 10^{-2}$ (ohm-cm.)$^{-1}$ at about 800° C. One preferred oxygen-ion conductor is an yttria-stablized zirconia membrane which has an electrode on either side of silver, platinum, gold or a semi-conducting oxide.

The oxygen-ion conducting membrane is preferably in the form of a thin-walled cylinder which forms a gas-tight enclosure when the open ends of the cylinder are connected to conduit means in which valves are located.

Figure 1:
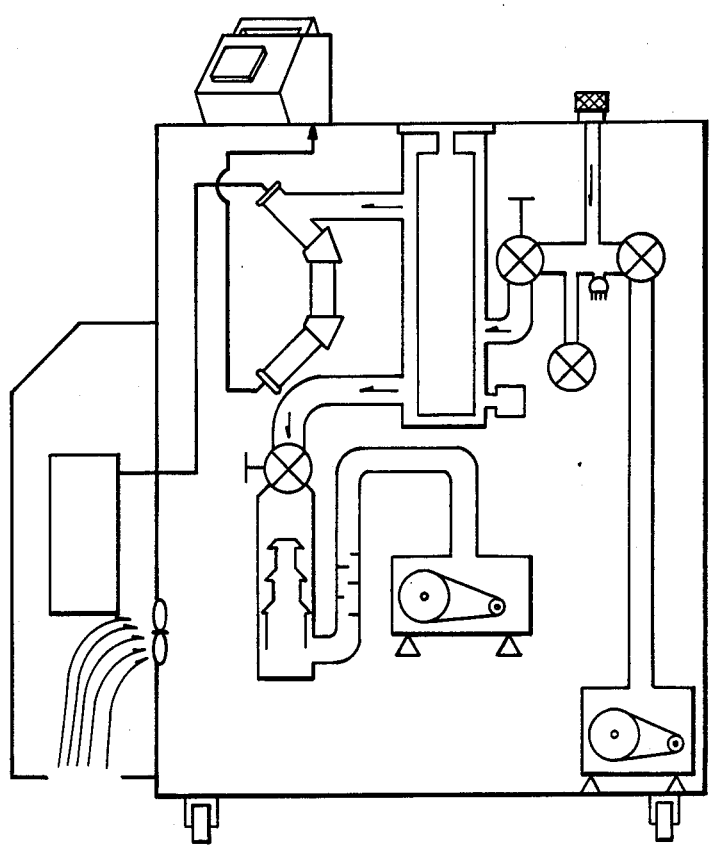
FIG. 1 is a schematic illustration of a prior art mass spectrometer leak detector.
Figure 2:
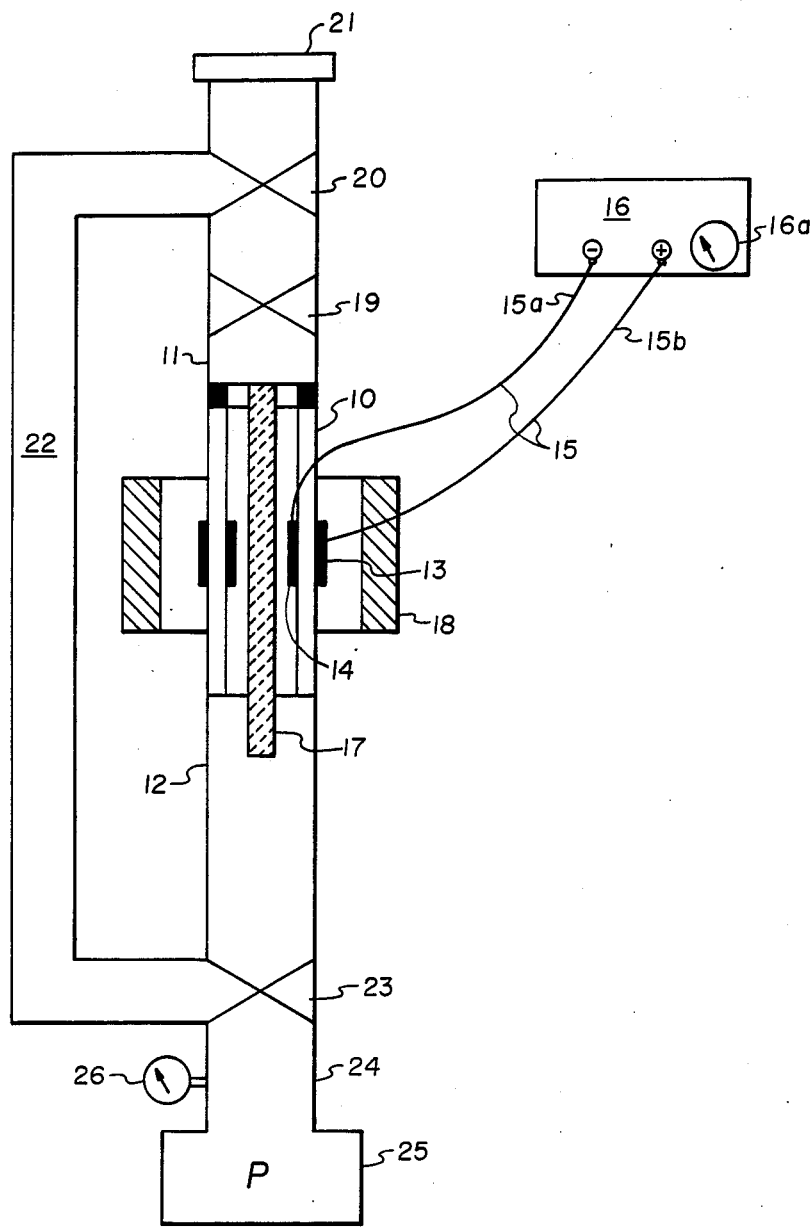
FIG. 2 is a schematic illustration of the leak detector of the instant invention.

Further description of the invention may be facilitated by reference to FIG. 2. A stabilized zirconia tube 10 having a cubic crystal structure is illustrated. A pair of conduit means 11 and 12 are connected in a gas-tight manner to the tube 10. The zirconia cylinder 10 and the conduit means 11 and 12 must have sufficient structural strength to tolerate a very high vacuum on the interior of the conduits and the zirconia cylinder.

An outer electrode 13 is adherent to the external surface of the zirconia cylinder and an inner electrode 14 is adherently attached to the interior of the zirconia cylinder. Each electrode is substantially porous to oxygen molecules and ions. The electrodes are attached by leads 15 to a power supply 16 and current measuring device 16a.

The power supply is a direct current device with the negative lead 15a attached to the inner electrode of the zirconia cylinder and the positive lead 15b attached to the outer electrode of the zirconia cylinder so that in operation the oxygen ions will flow from the interior of the zirconia chamber to its exterior. In the device illustrated a solid ceramic rod 17 (e.g., an alumina rod) is placed axially within the zirconia cylinder to occupy a significant portion of the volume existing in the interior of the zirconia cylinder. The presence of the rod on the inside of the cylinder restricts the volume to the annulus between the rod and the cylinder. A reduced volume is thus produced in the zirconia cylinder. Surrounding the zirconia cylinder is a heater or furnace 18 which effectively heats the zirconia cylinder optimally to a temperature of about 800° C. A preferable temperature range is between 600° C. to 1000° C.

A valve 19 is positioned in inlet conduit 11. Valve 19 is a two-way valve. Another valve 20, a three-way valve, effectively connects the conduit 11 with a port 21 to which an article to be tested is sealed. A bypass conduit 22 bypasses the cylinder 10. Conduit 22 connects outlet conduit 12, via a three-way valve 23 at their intersection, with the article to be tested. The three-way valve 23 also connects conduits 12 and 22 to conduit 24 which connects to a high-vacuum source. The leak detector of the instant invention may be operated by first pulling an ultrahigh vacuum on the chamber within cylinder 10 with valve 23 open in three directions while valves 19 and 20 are closed. The cylinder 10 is heated to a temperature such that a significant oxygen-ion conductivity, preferably greater than $1 \times 10^{-5}$ (ohm-cm.)$^{-1}$ and preferably in the range of $1 \times 10^{-2}$ (ohm-cm)$^{-1}$ or more is achieved to facilitate a very fast electrical response caused by the presence of oxygen molecules within the chamber.

A fixed voltage of about 0.5 to about 2 volts is applied from the dc power source 16 until the current due to Nerst voltage created by vacuum is nullified. A sample article to be checked is adapted to port 21. Valve 20 is opened so that the sample part is evacuated. Once a high vacuum is achieved in this sample part, then valve 19 is opened. If prior to opening valve 19 the vacuum meter 26 shows a distinct drop, then there is a gross leak in the sample part to be evaluated.

Upon opening of valve 19, a current flow registered by microamp meter 16a is indicative of the quantity of the leakage. Current as low as about 1/100 microamps can be measured. This value of current translates into a leakage rate of about $5.8 \times 10^{-10}$ cubic cm. per second.

In the event that any concern exists about the quality of the seal of the sample part to port 21, the seal area may be blanketed with nitrogen so that in the event of any gas leakage it is only nitrogen which is leaking through such a seal. Thus the oxygen reading is still a true reading of the magnitude of any leak involved in the sample part to be tested.

The zirconia cylinder 10 is preferably a thin-walled cylinder having a wall thickness of about 2 mm. or less. The length and diameter of the cylinder may vary, although typically the interior diameter of the cylinder will not exceed about three centimeters. The length of the chamber may vary significantly, although a length in excess of about ten centimeters is generally not required.

The interior diameter of the chamber should be sufficiently great to enable an internal electrode to be applied with some ease. The interior and exterior electrodes are generally of the same composition and are similar to the electrodes utilized in well-known oxygen sensing devices incorporated in the pollution control equipment associated with internal-combustion engines.

The electrodes may be any noble metal such as silver, platinum, or gold or semi-conducting oxide materials. The electrodes are oxygen permeable and are preferably very thin, e.g., about 10 micron in thickness.

For chambers less than about one centimeter in diameter very sophisticated techniques may be required to apply the inner electrode, for example, if the interior diameter of the cylinder is less than one-half centimeter in diameter. For chambers of such small diameter it is not necessary to include a spacer rod in the center such as the ceramic rod 17 of FIG. 2. When larger diameter chambers are used, for example, chambers of one centimeter diameter and greater, then a filler rod may be utilized so that the chamber has a significantly reduced effective volume to enhance the concentration of any oxygen ions which are introduced into the chamber. A chamber having an effective volume of about one-half to about five cubic centimeters is preferred, although smaller and larger volumes may be effectively utilized.

The area of electrode on the interior and exterior sides of the ion-conducting membrane should be substantially equal. A preferred cathode area is from about one to about 20 square centimeters.

The leak detector of the instant invention is particularly advantageous for detecting leaks in devices, especially in those devices which are sensitive to oxygen leaks.

The leak detector of the instant invention is very sensitive, giving accurate quantitative determinations of leaks as low as about $1 \times 10^{-10}$ cubic centimeter per second. It is also very durable, since the device is not harmed by the pressure of oxygen even in large quantities. Thus, leaving the sample port open during operation does not deleteriously affect any of the detector's components, unlike a mass spectrometer device in which the costly tungsten elements burn out if the sample port is left open during operation.

In operating the leak detector of the instant invention, it is necessary to impress a voltage slightly greater than the back emf generated by the oxygen partial pressure differential between the outside of the tube and the inside of the tube.

Because very low quantities of oxygen are determined, the operation of this detector in the current mode eliminates any inaccuracies which would be present due to varying oxygen partial pressure on the external side of the ion-conducting membrane. For example, an emf device would not be accurate at varying elevations above sea level unless a reference gas of known concentration and pressure was present on the external side of the membrane or the device was calibrated for different elevations above sea level.

The instant leak detector is accurate regardless of elevation and regardless of oxygen-ion concentration on the external side of the tube so long as the voltage impressed is greater than the maximum oxygen partial pressure expected to be encountered at any elevation.

The leak detector of the instant invention operates at a very low vacuum on the internal side of the membrane. At a vacuum of 0.01 microns a voltage of about 2 volts is impressed. At a 0.10 micron pressure, a voltage of 0.40 volts is impressed.

The leak detector of the instant invention is accurate, durable and reliable. It is simple to operate and, unlike existing leak detectors, does not require frequent calibration of the presence of inert gases as a testing medium.

I claim:

1. A leak detector comprising:
an oxygen-ion conducting membrane;
an oxygen-permeable electrode on each side of said membrane;
a gas-tight chamber having said membrane as at least a portion of a wall of said chamber with one electrode on the interior of said membrane and one electrode on the exterior of said membrane;
vacuum means for pulling a high vacuum on the internal cavity of said chamber;
connection means for interconnecting a device to be leak tested to said chamber;
power supply means to impress a low voltage across said electrodes;
current measuring means associated with said electrodes.

2. An electrochemical leak detector comprising:
a gas-tight chamber having gas inlet and outlet means;
an oxygen-ion conducting membrane forming at least a part of a wall of said chamber;
an oxygen-porous electrode on at least a portion of each opposed surface of said membrane;
closure means for opening and closing said outlet means;
sealing connection means to connect said inlet means in a leakproof manner to a device to be leak tested.

3. The leak detector of claim 2 wherein said oxygen ion conducting membrane is zirconium oxide.

4. The leak detector of claim 2 wherein said oxygen ion conducting membrane is a thin-walled cylinder.

5. The leak detector of claim 2 wherein said electrode consists of silver, platinum or gold.

6. The leak detector of claim 2 wherein a heater is juxtaposed to said membrane, said heater being capable of elevating the temperature of said membrane up to about 600° C. to about 1000° C.

7. The leak detector of claim 2 wherein voltage biasing means is connected to said electrodes, said biasing means being associated with a current detector.

8. The leak detector of claim 2 wherein vacuum means is connected to said chamber.

9. The leak detector of claim 2 wherein a by-pass conduit is interconnected with said sealing connection means and said vacuum means in a parallel relationship to said chamber.

10. The leak detector of claim 9 wherein inlet closure means and by-pass closure means enables said sealing connection means and said vacuum means to communicate (a) only through said chamber, (b) only through said by-pass conduit, or (c) both through said chamber and through said by-pass.

11. An electrochemical leak detector comprising:
a thin-walled cylinder of an oxygen ion conducting material, said cylinder forming an internal chamber having a gas inlet opening at one end and a gas outlet opening at the other end;
oxygen-porous electrodes on interior and exterior surfaces of at least a portion of the wall of said cylinder, said electrodes being substantially opposed to one another;
outlet closure means for opening and closing said outlet opening;
oxygen depletion means for substantially depleting the presence of oxygen atoms in said chamber;
inlet closure means for opening and closing said inlet opening;
sealing connection means to connect said inlet closure means in a leak-proof manner to a device to be leak tested;
heating means to heat said cylinder to a temperature of about 600° C. to about 1000° C.;
voltage generating means connected to said electrodes to impress a voltage across said electrodes to cause migration of oxygen ions from the electrode in the interior side of said cylinder wall to the electrode on the exterior side of said cylinder wall;
current detection means for detecting current flow caused by migration of oxygen ions from one electrode to the other electrode;
vacuum generating means associated with said outlet closure means.

12. The leak detector of claim 11 wherein said cylinder consists essentially of zirconium oxide.

13. The leak detector of claim 11 wherein said electrodes consist essentially of platinum, gold or silver.

14. The leak detector of claim 12 wherein the chamber volume is from about 0.5 to about 5 cubic centimeters.

15. The leak detector of claim 13 wherein the area of an electrode is about one to about 20 square centimeters.

16. The leak detector of claim 11 wherein said voltage generation means is capable of impressing a voltage of about 0.5 to about 2 volts across said electrodes.

17. The leak detector of claim 11 wherein said current detector is capable of detecting currents as low as 1/100 microamps.

18. The leak detector of claim 11 wherein said chamber contains a filler member to reduce the interior volume of the chamber.

19. The leak detector of claim 11 wherein a bypass conduct communicates with said chamber inlet and outlet opening closure means to enable said chamber to be isolated from said sealing connection means and said vacuum generating means.

* * * * *